United States Patent
Kaku et al.

(10) Patent No.: US 11,184,297 B2
(45) Date of Patent: Nov. 23, 2021

(54) RELAY DEVICE

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 29 days.

(21) Appl. No.: 16/800,252

(22) Filed: Feb. 25, 2020

(65) Prior Publication Data

US 2020/0304432 A1    Sep. 24, 2020

(30) Foreign Application Priority Data

Mar. 22, 2019  (JP) .............................. JP2019-055032

(51) Int. Cl.
*H04L 12/861* (2013.01)
*H04L 12/823* (2013.01)
*H04L 12/935* (2013.01)

(52) U.S. Cl.
CPC .......... *H04L 49/9005* (2013.01); *H04L 47/32* (2013.01); *H04L 49/3027* (2013.01); *H04L 49/9036* (2013.01)

(58) Field of Classification Search
CPC ..... H04L 2012/5681; H04L 2012/5682; H04L 47/6255; H04L 47/625; H04L 49/3027; H04L 47/32; H04L 49/9005; H04L 49/9036
See application file for complete search history.

(56) References Cited

U.S. PATENT DOCUMENTS

| | | | | |
|---|---|---|---|---|
| 6,167,054 A | * | 12/2000 | Simmons | G06F 13/1605 370/412 |
| 6,456,590 B1 | * | 9/2002 | Ren | H04L 47/10 370/229 |
| 6,618,390 B1 | * | 9/2003 | Erimli | H04L 49/90 370/395.7 |
| 6,657,955 B1 | * | 12/2003 | Bonneau | H04L 12/5602 370/229 |
| 8,045,561 B1 | * | 10/2011 | Varma | H04L 47/623 370/395.4 |
| 10,002,025 B2 | * | 6/2018 | Ozaki | G06F 9/505 |
| 10,248,460 B2 | * | 4/2019 | Kaneko | G06F 3/061 |

(Continued)

FOREIGN PATENT DOCUMENTS

| | | |
|---|---|---|
| JP | 2009-081595 A | 4/2009 |
| JP | 2017-147583 A | 8/2017 |

*Primary Examiner* — Wutchung Chu
(74) *Attorney, Agent, or Firm* — Posz Law Group, PLC (57) ABSTRACT

A relay device includes: multiple ports for transmitting and receiving a frame; at least one queue arranged for each of the ports, storing a transmission scheduled frame, and having a variable storage capacity; and a capacity controller controlling the storage capacity of each of queues for the ports. A distribution pattern of a value of the storage capacity allocated to each of the queues is defined as a capacity distribution pattern. The capacity distribution pattern includes a first pattern which is the capacity distribution pattern in an initial state and a second pattern which is different from the first pattern. The capacity controller switches the capacity distribution pattern from the first pattern to the second pattern when a predetermined switching condition is satisfied.

14 Claims, 7 Drawing Sheets

(56) References Cited

U.S. PATENT DOCUMENTS

| | | | |
|---|---|---|---|
| 2001/0021174 A1* | 9/2001 | Luijten | H04L 49/508 370/229 |
| 2002/0093910 A1 | 7/2002 | Yazaki et al. | |
| 2003/0050747 A1* | 3/2003 | Kamiya | G07C 5/008 701/33.4 |
| 2003/0202520 A1* | 10/2003 | Witkowski | H04L 49/255 370/400 |
| 2005/0163049 A1* | 7/2005 | Yazaki | H04L 47/22 370/230 |
| 2007/0140282 A1* | 6/2007 | Lakshmanamurthy | H04L 47/6255 370/412 |
| 2009/0220238 A1* | 9/2009 | Wang | H04L 47/10 398/79 |
| 2011/0010161 A1* | 1/2011 | Das | G06F 11/0727 703/22 |
| 2012/0210066 A1* | 8/2012 | Joshi | G06F 12/0811 711/118 |
| 2012/0210068 A1* | 8/2012 | Joshi | G06F 9/45558 711/122 |
| 2013/0067187 A1* | 3/2013 | Moss | G06F 3/0665 711/170 |
| 2014/0258788 A1* | 9/2014 | Maruyama | G06F 11/3452 714/47.3 |
| 2017/0163567 A1* | 6/2017 | Roitshtein | H04L 49/205 |
| 2020/0112608 A1* | 4/2020 | Patel | H04L 47/6255 |

* cited by examiner

PRIMARY PATTERN

|     | Q0 | Q1 |       |
|-----|----|----|-------|
| P0  | 8  | 8  |       |
| P1  | 8  | 8  |       |
| P2  | 8  | 8  |       |
| P3  | 8  | 8  |       |
| P4  | 8  | 8  |       |
| P5  | 8  | 8  |       |
| P6  | 8  | 8  | TOTAL |
| P7  | 8  | 8  | 128   |

FIG. 3

SECONDARY PATTERN

|     | Q0 | Q1 |       |
|-----|----|----|-------|
| P0  | 2  | 90 |       |
| P1  | 2  | 2  |       |
| P2  | 2  | 2  |       |
| P3  | 2  | 2  |       |
| P4  | 2  | 2  |       |
| P5  | 2  | 2  |       |
| P6  | 2  | 8  | TOTAL |
| P7  | 2  | 4  | 128   |

RELAY DEVICE

CROSS REFERENCE TO RELATED APPLICATION

The present application claims the benefit of priority from Japanese Patent Application No. 2019-55032 filed on Mar. 22, 2019. The entire disclosure of the above application is incorporated herein by reference.

TECHNICAL FIELD

The present disclosure relates to a relay device.

BACKGROUND

As a relay device configuring a network, for example, an Ethernet switch has been known. Ethernet is a registered trademark. The switch relays a frame by transmitting a frame received from any of multiple ports from a port to which a device of a destination of the frame is connected, among the multiple ports.

SUMMARY

According to an example embodiment, a relay device includes: multiple ports for transmitting and receiving a frame; at least one queue arranged for each of the ports, storing a transmission scheduled frame, and having a variable storage capacity; and a capacity controller controlling the storage capacity of each of queues for the ports. A distribution pattern of a value of the storage capacity allocated to each of the queues is defined as a capacity distribution pattern. The capacity distribution pattern includes a first pattern which is the capacity distribution pattern in an initial state and a second pattern which is different from the first pattern. The capacity controller switches the capacity distribution pattern from the first pattern to the second pattern when a predetermined switching condition is satisfied.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

For example, a conceivable technique described below discloses a relay device including a packet storage FIFO in which a packet to be transmitted from each of multiple transmission circuits is stored for the transmission circuit, and configured to transmit a packet stored in the packet storage FIFO from the transmission circuit. Similarly, in the Ethernet switch, a queue in which a frame scheduled to be transmitted is stored is provided for each of the multiple ports, and the frame stored in each queue is transmitted from the port corresponding to the queue.

As a result of a detailed examination by the present inventors, the following difficulties have been found with respect to the relay device having the queue in which the frames scheduled to be transmitted are stored for the multiple ports.

When a bandwidth of a communication path connected to a specific port temporarily increases due to a cause such as a concentration of the frames from the multiple ports to the specific port, that is, when a burst traffic occurs, the multiple frames waiting for transmission are accumulated in a queue corresponding to the specific port. Then, when the queue overflows, the frame cannot be accumulated in the queue, leading to a frame loss. In the present specification, the frame loss means that a frame scheduled to be transmitted (that is, a frame to be relayed) is lost. In order to improve the frame loss inhibition performance (hereinafter referred to as burst tolerance) due to the above burst traffic, it is considered that the capacity of all the queues is set to be sufficiently large in advance. However, in a normal state in which burst traffic does not occur, a large capacity of the queue is wasted.

A relay device is provided to be capable of increasing a capacity value of a specific queue by satisfying a predetermined condition without setting the capacity values of all the queues to be large in advance.

According to an example embodiment, a relay device for transferring a received frame, includes: a plurality of ports for transmitting and receiving a frame; at least one queue arranged for each of the ports, storing a transmission scheduled frame which is to be transmitted from a corresponding port, and having a variable storage capacity; and a capacity controller controlling the storage capacity of each of queues for the ports. A distribution pattern of a value of the storage capacity allocated to each of the queues is defined as a capacity distribution pattern. The capacity distribution pattern includes a first pattern which is the capacity distribution pattern in an initial state and a second pattern which is different from the first pattern. The capacity controller switches the capacity distribution pattern from the first pattern to the second pattern when a predetermined switching condition is satisfied.

According to the configuration described above, even if the capacity values of all the queues are not set to be large in advance, the capacity value of at least one specific queue can be increased by switching to the second pattern accompanying the establishment of the switching condition.

Therefore, when a condition that the burst traffic may occur in a communication path connected to a specific port is satisfied, the capacity value of the queue corresponding to the specific port can be increased. For that reason, the burst tolerance can be enhanced without setting the capacity values of all the queues to be large in advance.

Embodiments of the present disclosure will be described below with reference to the drawings.

1. First Embodiment

1-1. Configuration

Figure 1:
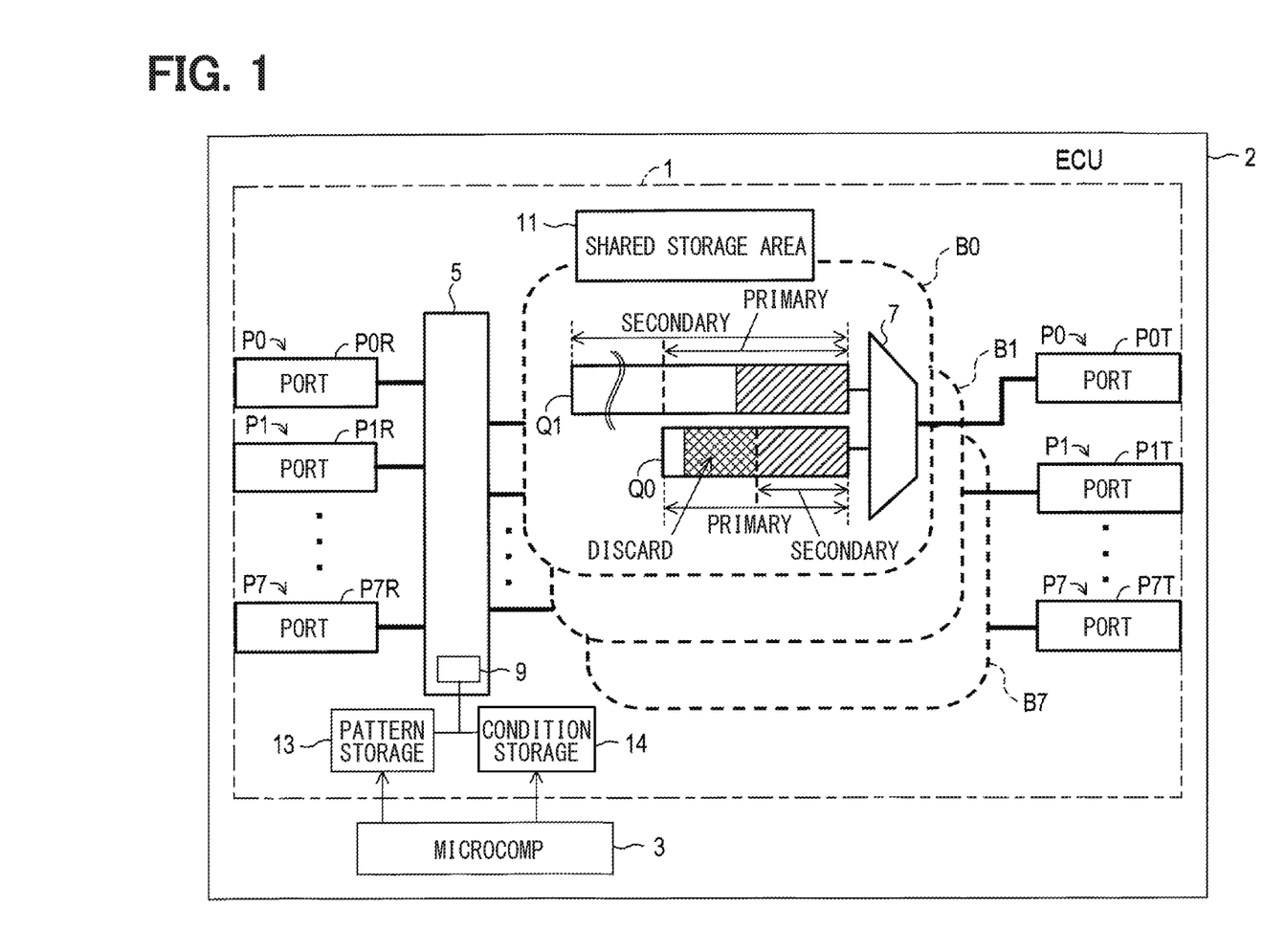
FIG. 1 is a block diagram showing a configuration of a relay device according to a first embodiment.

A relay device 1 according to a first embodiment shown in FIG. 1 is provided in, for example, an ECU 2 mounted on a vehicle. Then, the relay device 1 relays a communication between other ECUs mounted on the vehicle. The ECU is an abbreviation for "Electronic Control Unit", that is, an abbreviation for an electronic control device. The ECU 2 is also provided with a microcomputer 3 as a processing unit for performing each processing for controlling the operation of the ECU 2.

The relay device 1 includes multiple ports P0 to P7 for transmitting and receiving frames. Hereinafter, in each of the ports P0 to P7, a portion of hardware (for example, a reception circuit) for receiving a frame is referred to as reception ports P0R to P7R, and a portion of hardware (for example, a transmission circuit) for transmitting a frame is referred to as transmission ports P0T to P7T. When the reception ports P0R to P7R and the transmission ports P0T to P7T are generically referred to without being distinguished from each other, those reception ports are referred to as ports P0 to P7. The number of ports may be other than 8.

Each of the ports P0 to P7 is connected with any of the multiple ECUs different from the ECU 2 through a relay device having the same configuration as that of the relay device 1, or not through a relay device.

The relay device 1 transmits a frame received by one of the ports P0 to P7 (that is, a received frame) from a port of the ports P0 to P7 to which the ECU of the destination of the frame is connected. In the present embodiment, the frame is a frame based on the Ethernet standard (that is, an Ethernet frame).

The relay device 1 further includes an input processing unit 5 connected to the reception ports P0R to P7R, and buffer units B0 to B7 corresponding to the transmission ports P0T to P7T, respectively. Each of the buffer units B0 to B7 includes a first queue Q0, a second queue Q1, and a scheduler 7.

Each of the queues Q0 and Q1 stores a frame to be transmitted from a port corresponding to the queue Q0 or Q1 (that is, a transmission scheduled frame) and to be transmitted from a transmission port corresponding to a buffer unit provided with the queue Q0 or Q1. At least two levels of priority are set in the frame relayed by the relay device 1. For example, a frame having a lower priority (that is, a lower priority) is stored in the first queue Q0, and a frame having a higher priority (that is, a higher priority) is stored in the second queue Q1.

Determination of the transfer destination port of the received frame, that is, determination to transmit the frame from which of the port P0 to P7, and storage of the frame in one of the queues Q0 and Q1 corresponding to the destination port are performed by the input processing unit 5. The input processing unit 5 includes a capacity control unit 9 as a functional part for controlling the capacity of each of the queues Q0 and Q1. The transmission of the frames stored in the queues Q0 and Q1 from the ports is performed by the scheduler 7 corresponding to the queues. Each of the queues Q0 and Q1 means each of the queues Q0 and Q1 for each of the ports P0 to P7.

The input processing unit 5 and the scheduler 7 may be realized by, for example, a digital circuit, an analog circuit, or a combination thereof. The input processing unit 5 and the scheduler 7 may be implemented with the use of a microcomputer. In this case, the functions of the input processing unit 5 and the scheduler 7 may be realized by causing the CPU to execute a program stored in the non-transitory tangible storage medium.

1-2. Description of Matters Related to Queues

Each of the queues Q0 and Q1 has a variable capacity. The relay device 1 is provided with a shared storage area 11 used as each of the queues Q0 and Q1. A total value of capacity values allocated to the queues Q0 and Q1 (hereinafter referred to as a total queue capacity) is a capacity value of the shared storage area 11. In other words, the capacity of the shared storage area 11 is allocated to each of the queues Q0 and Q1. The shared storage area 11 may be, for example, a memory storage area. The memory may be, for example, a RAM or a rewritable non-volatile memory.

As a distribution pattern of the capacity values allocated to the queues Q0 and Q1 (hereinafter referred to as a capacity distribution pattern), there are a primary pattern which is a capacity distribution pattern in an initial state, and a secondary pattern which is different from the primary pattern. The primary pattern corresponds to a first pattern, and the secondary pattern corresponds to a second pattern which is a capacity distribution pattern switched from the primary pattern.

Figure 2:
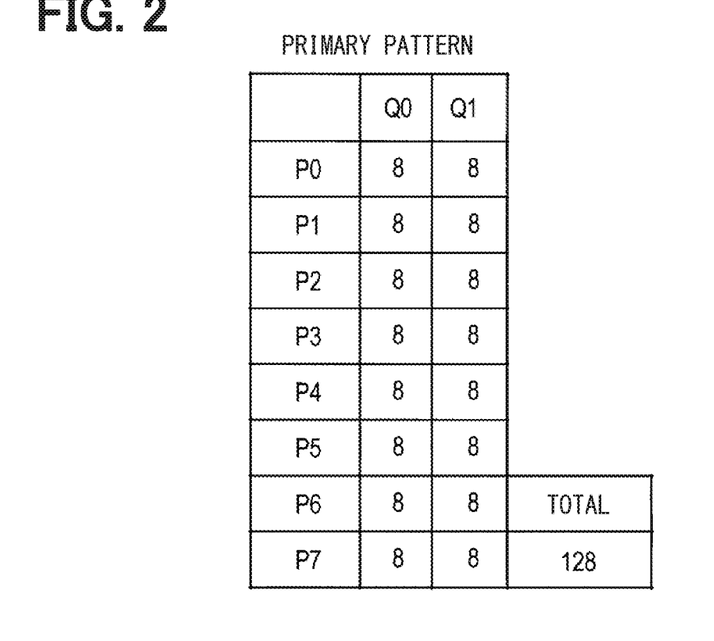
FIG. 2 is an illustrative diagram showing an example of a capacity value of each queue in a primary pattern.
Figure 3:
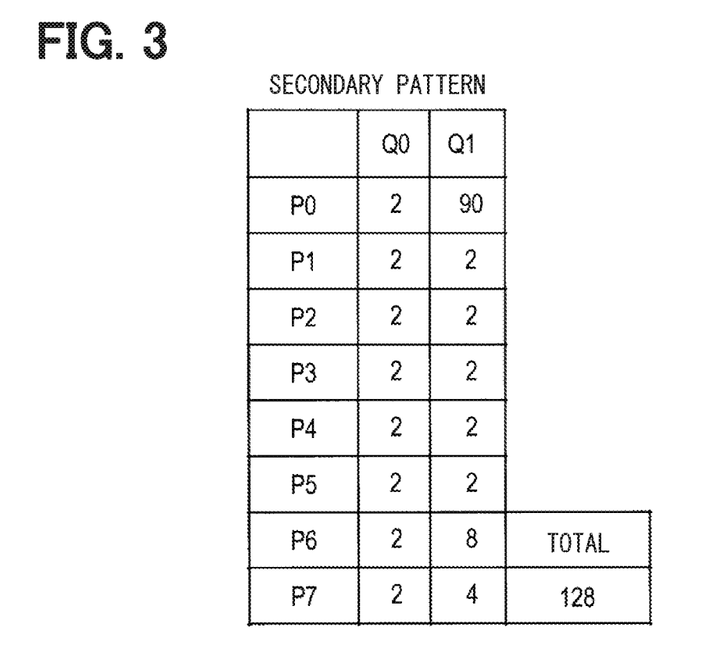
FIG. 3 is an illustrative diagram showing an example of a capacity value of each queue in a secondary pattern.

For example, when it is assumed that the total queue capacity is 128 KB, the capacity values of the queues Q0 and Q1 in the primary pattern (hereinafter referred to as primary capacity values) may be determined as exemplified in FIG. 2. The capacity values of the queues Q0 and Q1 in the secondary pattern (hereinafter referred to as secondary capacity values) may be determined as exemplified in FIG. 3. In both the primary pattern and the secondary pattern, the total queue capacity is 128 KB, and the capacity value allocated to each of the queues Q0 and Q1 is equal to or larger than the capacity value capable of storing at least one frame. In FIGS. 2 and 3, numerical values described are capacity values, and the unit of the capacity values is "KB". "KB" means "kilobytes". The numerical values are exemplified and are not limited.

In the present embodiment, as shown in FIG. 2, in the primary pattern, the capacity values of the queues Q0 and Q1 are set to 8 KB. In other words, the total queue capacity is evenly distributed to each of the queues Q0 and Q1. The capacity values of a part or all of the queues Q0 and Q1 may be set to values different from the capacity values of other queues. All the queues Q0 and Q1 mean all the queues Q0 and Q1 for each of the ports P0 to P7.

As shown in FIG. 3, in the secondary pattern, the capacity value of the queue Q1 of the port P0 is set to 90 KB which is larger than the primary capacity value (8 KB in the present embodiment), and in the other queues, the capacity value is set to be smaller than the primary capacity value (8 KB in the present embodiment) or the same value as the primary capacity value. Specifically, the capacity values of the queues Q0 of the ports P0, P6, and P7 and the queues Q0 and Q1 of the ports P1 to P5 are set to 2 KB, which is smaller than the primary capacity value. The capacity value of the queue Q1 of the port P7 is set to 4 KB, which is smaller than the primary capacity value. The capacity value of the queue Q1 of the port P6 is set to 8 KB which is the same as the primary capacity value.

In other words, the secondary pattern of FIG. 3 is a capacity distribution pattern for inhibiting a frame loss when a high-priority frame whose transfer destination port is the port P0 is received from any of the other ports P1 to P7 at a high frequency (for example, continuously) and a burst traffic occurs.

For example, one of the ports P1 to P7 is connected to an ECU (hereinafter referred to as imaging ECU) for transmitting image data obtained by imaging the periphery of the vehicle with a camera. An ECU (hereinafter referred to as vehicle control ECU) for controlling the vehicle based on the image data from the imaging ECU is connected to the port P0. For that reason, when the relay device 1 receives a frame (hereinafter referred to as an image data frame) transmitted from the imaging ECU and in which the image data is included in a data area (that is, payload) from any of the ports P1 to P7, the relay device 1 transmits the received frame from the port P0. Then, the imaging ECU continuously transmits multiple image data frames within a predetermined time. The image data frame is set to a high priority frame stored in the queue Q1 of the queues Q0 and Q1 of the port P0.

For that reason, when the image data frame is transmitted from the imaging ECU, a bandwidth of the communication path connected to the port P0 temporarily increases. In other words, a burst traffic occurs in the communication path connected to the port P0. In that case, in the relay device 1, the image data frame is temporarily stored in the queue Q1 of the port P0, but if the capacity value of the queue Q1 is small, the queue Q1 overflows, and the frame cannot be stored in the queue Q1, which causes a frame loss. In other words, the image data frame to be transmitted to the vehicle control ECU is lost. As described above, the image data frame from the imaging ECU to the vehicle control ECU is a specific example of a frame (hereinafter referred to as a burst factor frame) which is a factor of overflow due to the burst traffic with respect to the queue of a specific port. The queue of the specific port referred to in the present specification is the queue Q1 of the port P0 in the present embodiment.

Therefore, in the secondary pattern, the capacity value of the queue Q1 of the port P0 is set to 10 times or more as compared with the primary capacity value, and instead, the capacity value of one or more other queues is set to be smaller than the primary capacity value. When the capacity control unit 9 determines that the received frame is a burst factor frame (that is, the image data frame), the capacity control unit 9 switches the capacity distribution pattern from the primary pattern to the secondary pattern.

As shown in FIG. 1, the relay device 1 includes a pattern storage unit 13 in which the primary pattern and the secondary pattern are stored, and a condition storage unit 14 in which a condition for switching from the primary pattern to the secondary pattern (that is, a switching condition) is stored. The capacity control unit 9 is capable of at least reading and accessing the pattern storage unit 13 and the condition storage unit 14. The primary pattern and the secondary pattern are written in the pattern storage unit 13 by, for example, the microcomputer 3. Similarly, the switching condition is written in the condition storage unit 14 by, for example, the microcomputer 3.

In the present embodiment, the switching condition is a condition that the received frame is a burst factor frame, in other words, a condition that the received frame satisfies a predetermined condition (hereinafter referred to as a burst factor frame condition) that can be determined as a burst factor frame. The condition storage unit 14 may store the burst factor frame condition as the switching condition. The burst factor frame condition may be a condition that a value of specific information included in the received frame is a predetermined value. The specific information may be information capable of identifying at least one of a destination of the frame and a type of data included in the frame.

For example, the value of the specific information may be a predetermined field value in any one of an Ethernet header, an IP header, and an UDP/TCP header, and/or a value of the information included in a predetermined position of the payload. The predetermined field value may be a field value capable of identifying at least a destination, and may be, for example, a value of a destination address or a value of a port number (that is, a destination port number) to be used by the destination application. The information included in the predetermined position of the payload may be, for example, data type information indicating the type of data included in the payload.

The burst factor frame condition may further include a condition that the port on which the frame is received is a predetermined port. In the present embodiment, the predetermined port may be a port to which the imaging ECU is connected.

1-3. Processing Performed by Capacity Control Unit

Next, the capacity control process to be performed by the capacity control unit 9 will be described with reference to FIGS. 4 and 5.

Figure 4:
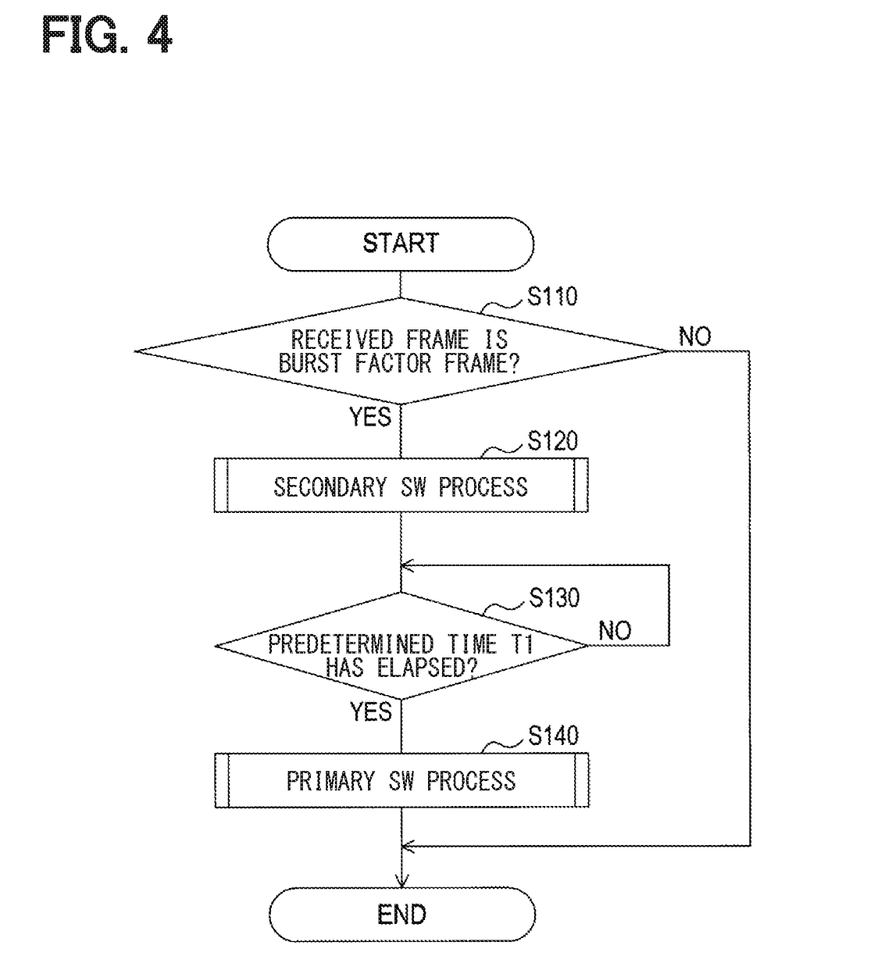
FIG. 4 is a flowchart showing a capacity control process.

When a frame is received by any of the ports P0 to P7, the capacity control unit 9 performs the capacity control process of FIG. 4.

As shown in FIG. 4, in the capacity control process, the capacity control unit 9 determines whether or not the received frame is a burst factor frame in S110. In other words, it is determined whether or not the received frame satisfies the burst factor frame condition as the switching condition. For example, when the destination address in the Ethernet header of the received frame is an address of the vehicle control ECU and the data type information included in the payload of the received frame is information indicating the image data, it may be determined that the received frame is a burst factor frame. The received frame determined to be a burst factor frame in S110 is a frame that is stored in the queue Q1 of the port P0, and then extracted from the queue Q1 and transmitted from the port P0.

When it is determined in S110 that the received frame is not a burst factor frame, the capacity control unit 9 ends the capacity control process, but when it is determined that the received frame is a burst factor frame, the capacity control unit 9 determines that the switching condition is satisfied, and proceeds to S120.

Figure 5:
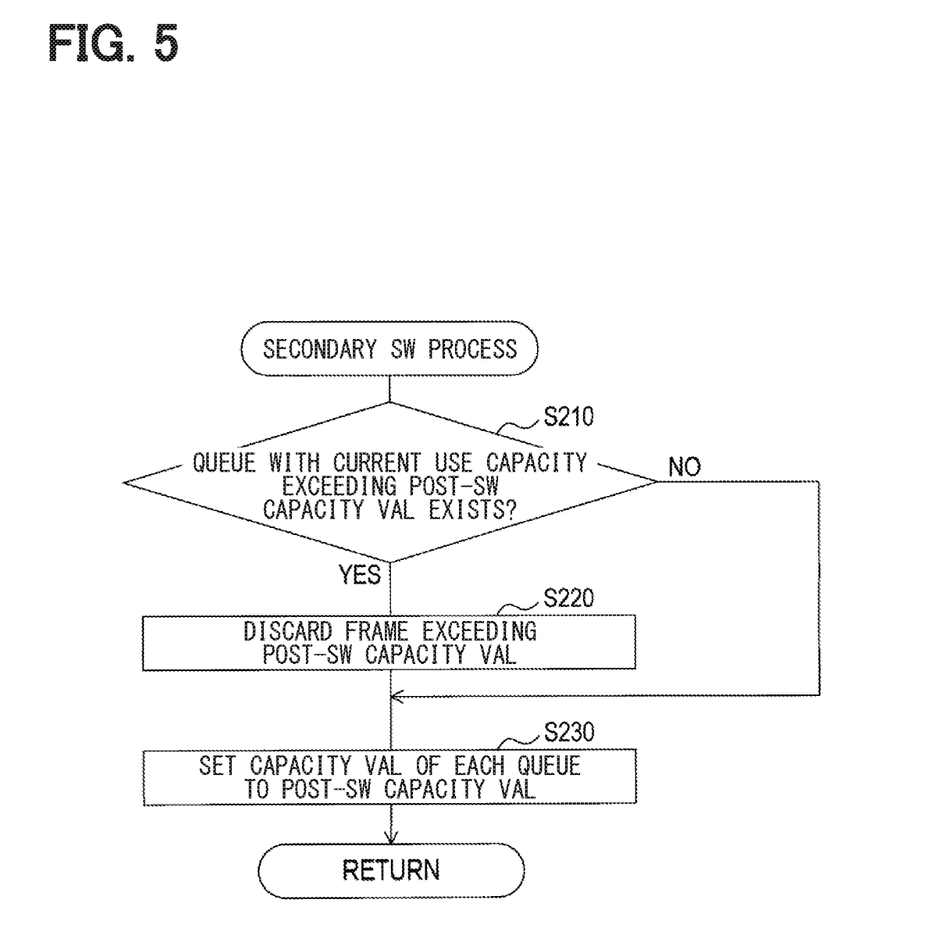
FIG. 5 is a flowchart showing a secondary switching process.

Then, in S120, the capacity control unit 9 performs the secondary switching process of FIG. 5 as a process for switching the capacity distribution pattern from the primary pattern to the secondary pattern.

As shown in FIG. 5, when the secondary switching process is started, the capacity control unit 9 determines whether or not there is a queue (hereinafter referred to as an excess queue) in which the current use capacity exceeds a post-switching capacity value in the queues Q0 and Q1 in S210. The use capacity is the capacity used to store the frame in the queue. The post-switching capacity value is the capacity value of the queue in the post-switching capacity distribution pattern. The capacity distribution pattern after switching is, in other words, the capacity distribution pattern of the switching destination to be switched from now on. For that reason, the post-switching capacity value in the secondary switching process is a secondary capacity value.

When it is determined in S210 that there is an excess queue, the capacity control unit 9 proceeds to S220, and discards the frames of each of the excess queues that exceed the post-switching capacity value (that is, the secondary capacity value) among the frames stored in the appropriate queue. Thereafter, the process proceeds to S230. When the capacity control unit 9 determines that there is no excess queue in S210, the capacity control unit 9 proceeds to S230 as it is.

In S230, the capacity control unit 9 sets the capacity values of the queues Q0 and Q1 to the post-switching capacity values of the queues, and then ends the secondary switching process.

As shown in FIG. 4, when the secondary switching process is completed in S120, the capacity control unit 9 proceeds to S130, and determines whether or not a predetermined period T1 has elapsed since the secondary switching process has been completed, that is, since the capacity distribution pattern has been switched to the secondary pattern. Then, in S130, a waiting is made until the predetermined period T1 elapses.

When it is determined in S130 that the predetermined period T1 has elapsed, the capacity control unit 9 proceeds to S140, and performs the primary switching process similar to the secondary switching process of FIG. 5 as a process for switching the capacity distribution pattern from the secondary pattern to the primary pattern.

The primary switching process performed in S140 is different from the secondary switching process of FIG. 5 in that the "post-switching capacity value" is not the secondary capacity value but the primary capacity value, and the other contents are the same. Then, when the primary switching process is completed in S140, the capacity control process is completed.

1-4. Operation Example

In the relay device 1, when the image data frame stored in the queue Q1 of the port P0 is received from any one of the ports P1 to P7, the capacity control unit 9 determines that the switching condition is satisfied, and the capacity distribution pattern is switched from the primary pattern to the secondary pattern.

For that reason, as shown in FIG. 1, in the queues Q1 and Q0 of the port P0, the capacity value of the queue Q1 increases to the secondary capacity value (for example, 90 KB) larger than the primary capacity value (for example, 8 KB), and the capacity value of the queue Q0 decreases to the secondary capacity value (for example, 2 KB) smaller than the primary capacity value (for example, 8 KB).

When the capacity distribution pattern is switched, if a frame exceeding the post-switching capacity value is stored in the queue Q0 of the port P0 whose capacity value decreases, the frame exceeding the post-switching capacity value (that is, the secondary capacity value) is discarded as cross-hatched in FIG. 1.

Among the queues Q0 and Q1 of the other ports P1 to P7, the capacity value other than the queue Q1 of the port P6 is also reduced by switching to the secondary pattern, similarly to the queue Q0 of the port P0. In the queue Q1 of the port P6, since the primary capacity value and the secondary capacity value are the same, the capacity value does not change even if the capacity distribution pattern is switched to another.

1-5. Effects

According to the first embodiment described in detail above, the following effects are obtained.

(1a) The capacity control unit 9 recognizes, as a burst factor frame, an image data frame transmitted after being temporarily stored in the queue Q1 of the port P0 and continuously transmitted within a predetermined period of time. Then, when the capacity control unit 9 determines that the received frame is the burst factor frame, the capacity control unit 9 determines that the switching condition is satisfied, and switches the capacity distribution pattern from the primary pattern to the secondary pattern in which the capacity distribution amount to the queue Q1 of the port P0 increases. In other words, when a specific frame that causes an overflow of the queue starts to be received, the capacity control unit 9 switches the capacity distribution pattern to a secondary pattern in which the capacity distribution to the queue in which the specific frame is stored increases. Therefore, even if the capacity values of all the queues Q0 and Q1 are not set to be large in advance, the capacity value of the queue Q1 of the port P0 can be increased when there is a possibility that a burst traffic occurs in the communication path connected to the port P0. For that reason, the burst tolerance can be enhanced without setting the capacity values of all the queues Q0 and Q1 to be large in advance.

(1b) In the primary pattern and the secondary pattern, the capacity values allocated to the queues Q0 and Q1 are equal to or larger than the capacity value capable of storing at least one frame, and the total queue capacity is the same. In the queue Q1 of the port P0 which is the storage destination of the burst factor frame in the queues Q0 and Q1, the secondary capacity value is set to a value larger than the primary capacity value.

For that reason, the minimum frame storage performance of each of the queues Q0 and Q1 can be ensured in the primary pattern and the secondary pattern, and the burst tolerance of the queue Q1 of the port P0 can be enhanced without increasing the total queue capacity. Therefore, the burst tolerance and the minimum frame storage performance can be made compatible with each other while inhibiting the total queue capacity.

As a comparative example, a configuration can be considered in which each of the queues Q0 and Q1 uses the capacity of the shared storage area 11 on a first-come-first-served basis. In the configuration of the above comparative example, when the use capacity of one or more queues becomes large, there is a possibility that the capacity of other queues cannot be secured at all, that is, there is a possibility that a queue in which no frame can be stored is generated. This results in a port on which the frame transfer cannot be performed, which in turn impairs the relay function of the frame. However, according to the present embodiment, the difficulties of the comparative example are avoided.

(1c) The capacity control unit 9 is configured to switch the capacity distribution pattern to the primary pattern when a predetermined period T1 elapses after switching the capacity distribution pattern to the secondary pattern. This makes it possible to easily determine whether or not to return from the secondary pattern to the primary pattern without obtaining information different from an elapsed time.

(1d) The capacity control unit 9 is configured to determine whether or not the switching condition is satisfied on the basis of a specific information included in the received frame. For that reason, switching from the primary pattern to the secondary pattern can be performed by analyzing the received frame. Therefore, a situation analysis different from the analysis of the received frame, such as calculation and detection of an actual traffic, becomes unnecessary, and the processing is easily simplified.

(1e) When switching the capacity distribution pattern to another, the capacity control unit 9 is configured to discard a frame exceeding the post-switching capacity value, among the frames stored in the queue, for a queue whose use capacity exceeds the post-switching capacity value. For that reason, the processing for switching the capacity distribution pattern is easily simplified.

2. Second Embodiment

2-1. Differences from First Embodiment

Since a basic configuration of a second embodiment is the same as that of the first embodiment, differences will be described below. The same reference numerals as in the first embodiment denote the same components, and reference is made to the preceding description.

Figure 6:
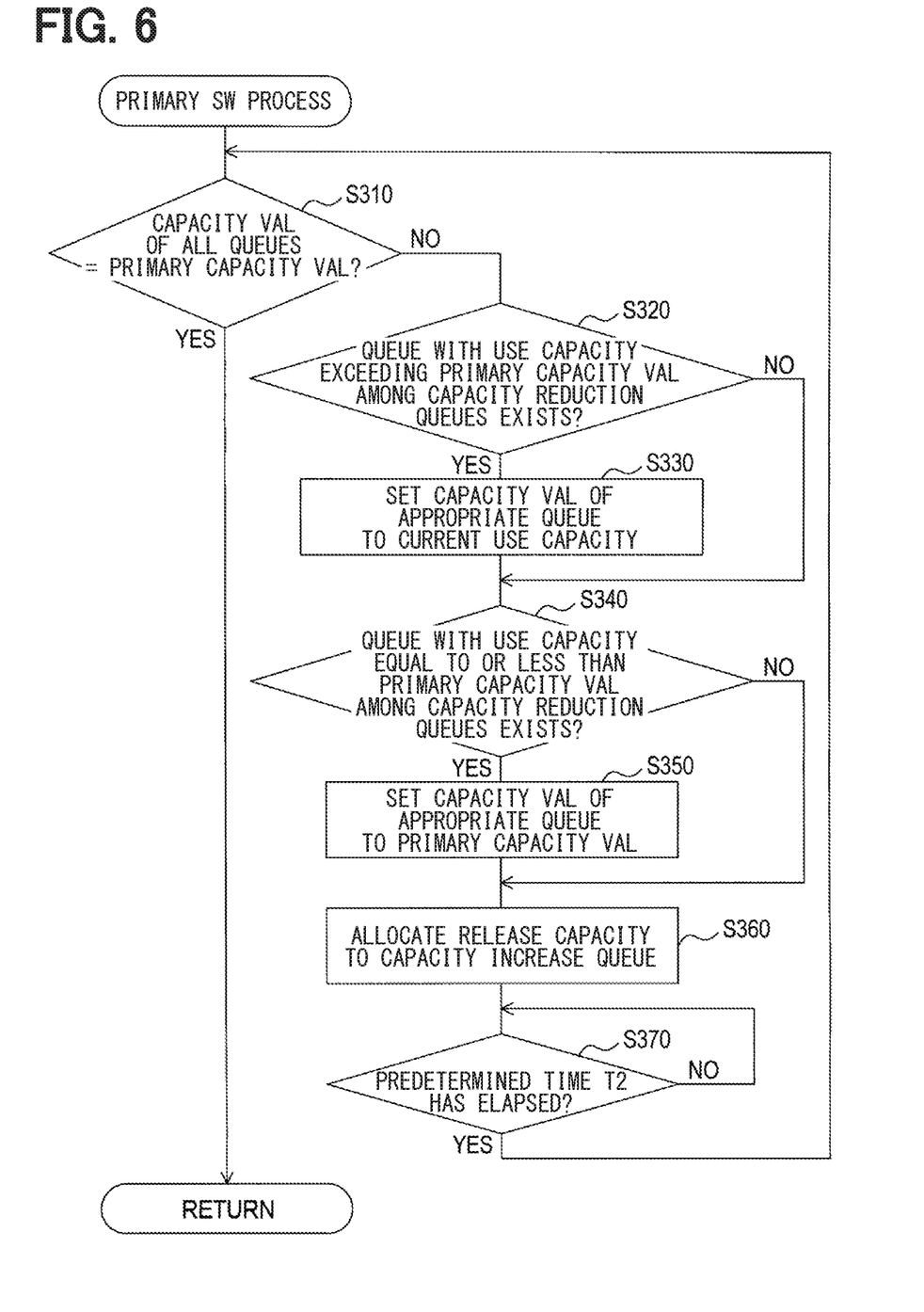
FIG. 6 is a flowchart showing a primary switching process according to a second embodiment.

The second embodiment differs from the first embodiment in that a capacity control unit 9 performs a primary switching process of FIG. 6 as a process for switching (that is, returning) a capacity distribution pattern from a secondary pattern to a primary pattern in S140 of FIG. 4.

2-2. Processing

The primary switching process performed by the capacity control unit 9 will be described with reference to FIG. 6. In the primary switching process of FIG. 6, capacity values of queues Q01 and Q0 are switched from a secondary capacity value to a primary capacity value by processes of S320 to S370. The secondary capacity value in the primary switching process according to the second embodiment is a capacity value before switching, and the primary capacity value is a post-switching capacity value. The pre-switching capacity value is a capacity value of the queue in a pre-switching capacity distribution pattern.

As shown in FIG. 6, in the primary switching process, the capacity control unit 9 determines whether or not the capacity values of all the queues Q0 and Q1 are set to the primary capacity values in S310. When it is determined that the capacity values of all the queues Q0 and Q1 have been set to the primary capacity values, that is, when it is determined that the switching from the secondary pattern to the primary pattern has been completed, the primary switching process is terminated.

When a negative determination is made in the above S310, that is, when the capacity value of at least one of all the queues Q0 and Q1 has not yet been set to the primary capacity value, the capacity control unit 9 proceeds to S320.

In S320, the capacity control unit 9 determines whether or not there is a queue (that is, an excess queue) in which the current use capacity exceeds the primary capacity value as the post-switching capacity value, among the queues (hereinafter referred to as capacity reduction queues) in which the capacity value decreases due to switching of the capacity distribution patterns.

When switching from the secondary pattern to the primary pattern is performed, the capacity reduction queue is a queue in which the primary capacity value is smaller than the secondary capacity value. In the specific example shown in FIGS. 2 and 3, the queue Q1 of the port P0 is a capacity reduction queue. Also, in all the queues Q0 and Q1, the capacity reduction queue may become an excess queue.

When it is determined in the above S320 that there is an excess queue, the capacity control unit 9 proceeds to S330, sets the capacity value of the excess queue to the current use capacity of the excess queue, and then proceeds to S340. When the capacity control unit 9 determines that there is no excess queue in the above S320, the capacity control unit 9 proceeds to S340 as it is.

In S340, the capacity control unit 9 determines whether or not there is a queue in which the current use capacity is equal to or less than the primary capacity value, that is, a queue in which the current use capacity is equal to or less than the primary capacity value, and a queue in which the current use capacity is equal to or less than the primary capacity value (hereinafter referred to as a capacity reduction non-excess queue) among the capacity reduction queues. Incidentally, even if the excess queue is determined to be "present" in the above S320, the frame stored in the queue is transmitted, so that a capacity reduction non-excess queue is eventually obtained.

When it is determined in the above S340 that there is a capacity reduction non-excess queue, the capacity control unit 9 proceeds to S350, sets a capacity value of the capacity reduction non-excess queue to the primary capacity value of the queue, and then proceeds to S360. When it is determined in the above S340 that there is no capacity reduction non-excess queue, the capacity control unit 9 proceeds to S360 as it is.

In S360, the capacity control unit 9 allocates the capacity (hereinafter referred to as the release capacity) released from the excess queue or the capacity reduction non-excess queue by the above process of S330 or S350 as the capacity value of the queue (hereinafter referred to as the capacity increase queue) whose capacity value increases by switching the capacity distribution pattern to another.

When switching from the secondary pattern to the primary pattern is performed, the capacity increase queue is a queue having a larger primary capacity value than the secondary capacity value. In the specific example shown in FIGS. 2 and 3, the queues Q0 of the ports P0 and P6 and the queues Q0 and Q1 of the ports P1 to P5 and P7 are capacity increase queues. Further, the release capacity by the process of S330 is a decrease in the capacity value of the queue by setting the capacity value of the excess queue to the use capacity. Further, the release capacity by the process of S350 is a decrease in the capacity value of the queue by setting the capacity value of the capacity reduction non-excess queue to the primary capacity value.

Further, in S360, the allocation of the release capacity to the capacity increase queue is performed within a range in which the capacity value of the queue does not exceed the primary capacity value of the queue. When there are multiple capacity increase queues whose capacity values are not the primary capacity values, the release capacity may be equally allocated (that is, distributed) to the multiple capacity increase queues in S360. The term "equally" referred to herein may strictly mean "equally", but may be as "equally" as possible.

For example, it is assumed that there are four queues A, B, C, and D as capacity increase queues whose capacity value is not the primary capacity value, and the release capacity is M. For each of the queues A to D, it is assumed that a difference between the current capacity value and the primary capacity value is "M/4" or more. In this instance, in S360, a capacity of "M/4" may be allocated to each of the queues A to D.

It is assumed that a difference ΔD between the current capacity value and the primary capacity value is less than "M/4" for the queue D among the queues A to D, and a difference between the current capacity value and the primary capacity value is equal to or greater than "(M−ΔD)/3" for each of the queues A to C. In this instance, in S360, the capacity value of the queue D may be set as the primary capacity value by allocating ΔD of M which is the release capacity for the queue D, and the capacity obtained by equally dividing "M−ΔD" which is the remaining portion of the release capacity, that is, "(M−ΔD)/3" may be allocated for the other queues A to C.

After performing the process of S360, the capacity control unit 9 proceeds to S370, and determines whether or not a predetermined period T2 has elapsed since a negative determination is made in S310 and the process proceeds to S320. Then, in S370 waiting is made until a predetermined period T2 elapses. The predetermined time T2 is shorter than the predetermined time T1 described above, for example. In S370, for example, it may be determined whether or not the predetermined period T2 has elapsed since the process of S360 has been performed.

When it is determined in the above S370 that the predetermined period T2 has elapsed, the capacity control unit 9 returns to S310.

2-3. Operation Example

An example of the operation by the process of FIG. 6 will be described with reference to FIGS. 7 and 8. In each of FIGS. 7 and 8, a waveform of a solid line indicates the capacity value of the queue Q1 of the port P0, and a waveform of a dotted line indicates the use capacity of the queue Q1 of the port P0. In the waveform of the dotted line, a portion where the height gradually decreases indicates that the frames stored in the queue Q1 of the port P0 are sequentially transmitted.

Figure 7:
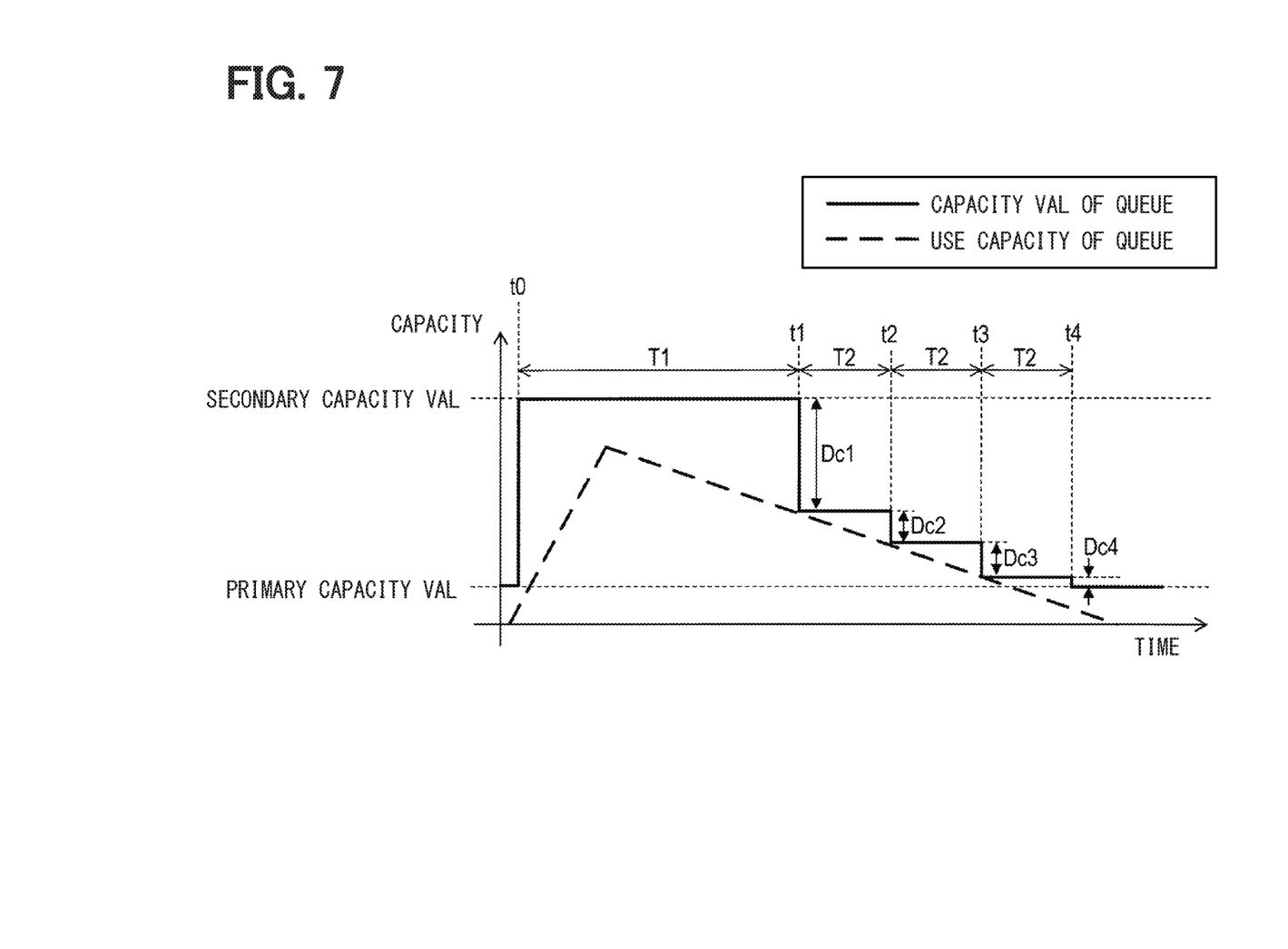
FIG. 7 is a first illustrative view showing an operation example of the second embodiment.

FIG. 7 shows a case in which the use capacity of the queue Q1 of the port P0 (that is, the capacity reduction queue) exceeds the primary capacity value of the port P0 at the time point when the primary switching process of FIG. 6 is started in S140 of FIG. 4.

As shown in FIG. 7, it is assumed that the secondary switching process of FIG. 5 is performed at a time t0, and thereafter, the primary switching process of FIG. 6 is started at a time t1 when a predetermined time T1 has elapsed.

When the use capacity of the queue Q1 of the port P0 exceeds the primary capacity value of the queue at the time t1, it is determined in S320 of FIG. 6 that there is an excess queue, and the process of S330 of FIG. 6 is performed. Therefore, the capacity value of the queue Q1 of the port P0 which is the excess queue is set to the current use capacity of the queue. A decrease Dc1 in the capacity value of the queue Q1 of the port P0 by setting the capacity value of the queue Q1 of the port P0 to the use capacity becomes a release capacity, and the release capacity is allocated as the capacity value of the capacity increase queue in S360 of FIG. 6.

Thereafter, at the time t2 when the predetermined time T2 has elapsed, the determination of S320 in FIG. 6 is performed again, and when the use capacity of the queue Q1 of the port P0 still exceeds the primary capacity value at that time, the process of S330 in FIG. 6 is performed again. Therefore, the capacity value of the queue Q1 of the port P0 which is the excess queue is set to the current use capacity of the queue. A decrease Dc2 in the capacity value of the queue Q1 of the port P0 by setting the capacity value of the queue Q1 of the port P0 to the use capacity becomes a release capacity, and the release capacity is allocated as the capacity value of the capacity increase queue in S360 of FIG. 6.

Thereafter, also, at a time t3 when the predetermined time T2 has elapsed, the same processing as that at the time t2 is performed. "Dc3" in FIG. 7 indicates the release capacity at the time t3.

Thereafter, at a time t4 when the predetermined time T2 has elapsed, the determination of S320 in FIG. 6 is performed again, and when the use capacity of the queue Q1 of the port P0 is equal to or less than the primary capacity value, it is determined in S340 of FIG. 6 that there is a capacity reduction non-excess queue. Then, the process of S350 in FIG. 6 is performed. Therefore, the capacity value of the queue Q1 of the port P0 which has become the capacity reduction non-excess queue is set to the primary capacity value. Then, a decrease Dc4 in the capacity value of the queue Q1 of the port P0 by setting the capacity value of the queue Q1 of the port P0 to the primary capacity value becomes a release capacity, and the release capacity is allocated as the capacity value of the capacity increase queue in S360 of FIG. 6.

Further, in the present embodiment, in switching to the primary pattern, the capacity reduction queue is only the queue Q1 of the port P0. For that reason, when the process of S360 in FIG. 6 is performed after the process of S350 in FIG. 6 has been performed on the queue Q1 of the port P0, the capacity values of all the queues Q0 and Q1 become the primary capacity values of the queue. Hence, thereafter, "YES" is determined in S310 of FIG. 6, and the primary switching process of FIG. 6 is terminated.

Figure 8:
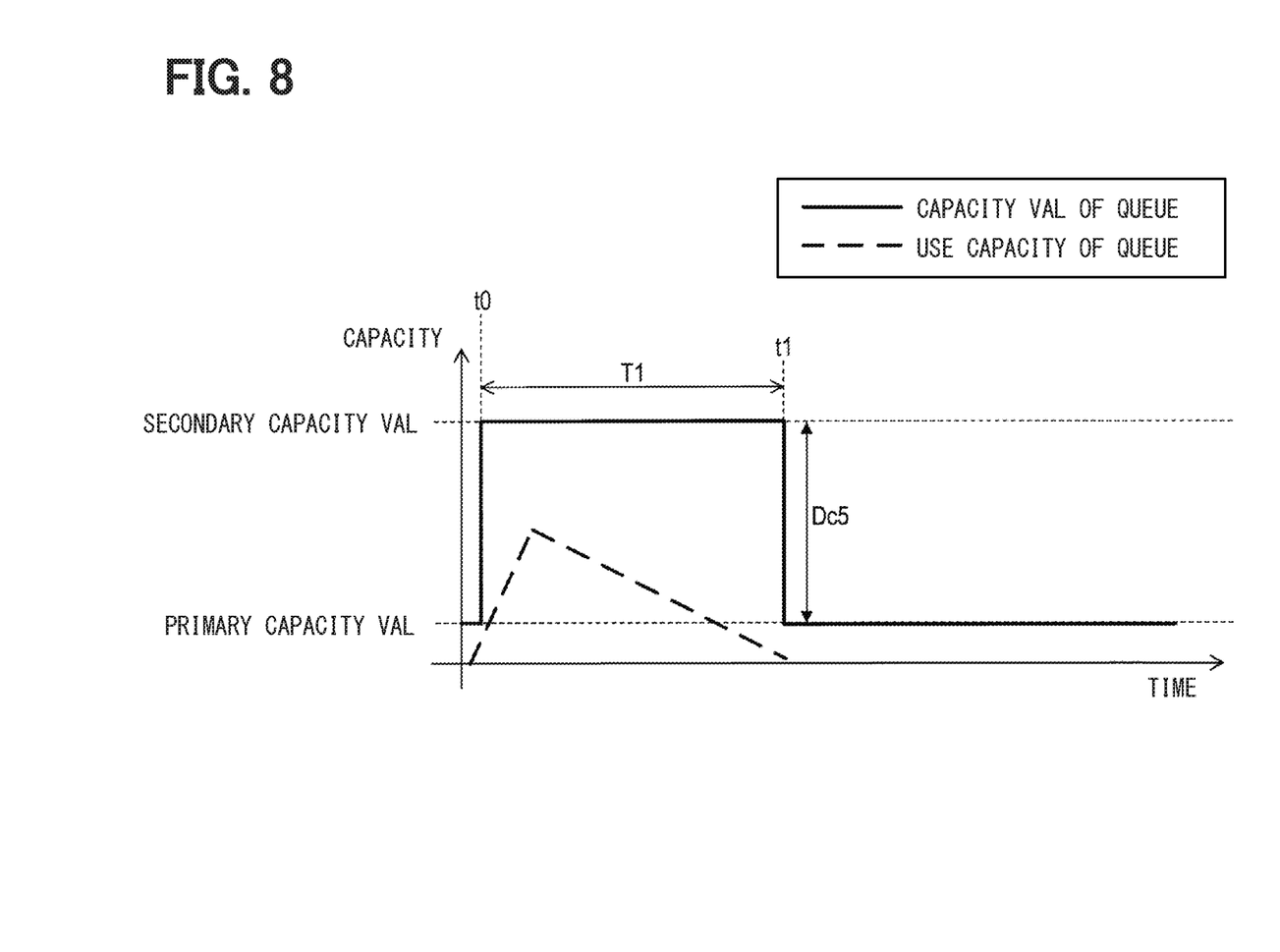
FIG. 8 is a second illustrative view showing an operation example of the second embodiment.

On the other hand, FIG. 8 shows a situation in which the use capacity of the queue Q1 of the port P0 is equal to or less than the primary capacity value of the port P0 at the time when the primary switching process of FIG. 6 is started in S140 of FIG. 4.

As shown in FIG. 8, it is assumed that the secondary switching process of FIG. 5 is performed at a time t0, and thereafter, the primary switching process of FIG. 6 is started at a time t1 when a predetermined time T1 has elapsed.

When the use capacity of the queue Q1 of the port P0 is equal to or smaller than the primary capacity value of the queue at the time t1, it is determined in S340 of FIG. 6 that there is a capacity reduction non-excess queue, and the process of S350 in FIG. 6 is performed. Therefore, the capacity value of the queue Q1 of the port P0 which is the capacity reduction non-excess queue is set to the primary capacity value of the queue.

A decrease Dc5 in the capacity value of the queue Q1 of the port P0 by setting the capacity value of the queue Q1 of the port P0 to the primary capacity value becomes a release capacity, and the release capacity is allocated as the capacity value of the capacity increase queue in S360 of FIG. 6. Dc5 in FIG. 8 is equal to the sum of the Dc1 to Dc4 in FIG. 7. Thereafter, the determination of "YES" is made in S310 of FIG. 6, and the primary switching process of FIG. 6 is terminated.

2-4. Effects

According to the second embodiment described in detail above, the effects (1a) to (1d) described in the first embodiment are obtained, and the effect (1e) described in the first embodiment is also obtained for switching from the primary pattern to the secondary pattern. Further, the following effects are obtained.

(2a) When switching from the secondary pattern to the primary pattern, the capacity control unit 9 performs the processes of S330 and S360 in FIG. 6 for each predetermined period T2 for the excess queue until the use capacity of the queue becomes equal to or less than the primary capacity value by transmitting the frame stored in the queue. Then, in the processes of S330 and S360, the capacity value of the excess queue is set to the current use capacity of the queue, and a decrease in the capacity value of the excess queue due to the setting (that is, a release capacity) is allocated as the capacity value of at least one capacity increase queue. For that reason, when switching from the secondary pattern to the primary pattern, the switching to the primary pattern can be completed without discarding the frame stored in the excess queue. The processes of S330 and S360 in FIG. 6 correspond to a capacity change process. On the other hand, when the capacity distribution pattern is switched from the primary pattern to the secondary pattern, the same processing as the processing of FIG. 6 may be performed.

3. Other Embodiments

Although the embodiments of the present disclosure have been described above, the present disclosure is not limited to the embodiments described above, and various modifications can be made to implement the present disclosure.

3-1. Other Embodiment 1

The condition storage unit 14 may store multiple switching conditions (for example, burst factor frame conditions). The pattern storage unit 13 may store multiple different secondary patterns in association with each of the multiple switching conditions stored in the condition storage unit 14.

In this instance, in S110 of FIG. 4, the capacity control unit 9 may determine whether or not any of the multiple switching conditions stored in the condition storage unit 14 is satisfied. Specifically, it may be determined whether or not the received frame satisfies any of the multiple burst factor frame conditions as the multiple switching conditions, in other words, it may be determined whether or not the received frame is any of the multiple burst factor frames. When it is determined that any one of the switching conditions is satisfied, the capacity control unit 9 proceeds to S120 of FIG. 4, and in the secondary switching process performed in S120, the capacity distribution pattern may be switched to the secondary pattern corresponding to the switching condition determined to be satisfied in the above S110. According to the configuration described above, the burst tolerance can be enhanced for the multiple burst factor frames.

3-2. Other Embodiment 2

The capacity control unit 9 may be configured to change the capacity values (that is, secondary capacity values) of the queues Q0 and Q1 in the secondary pattern based on the information included in the frame received when the switching condition is satisfied in S110 of FIG. 4.

For example, the frame determined as the burst factor frame in S110 of FIG. 4 may include capacity value information capable of instructing the secondary capacity values of the queues Q0 and Q1. Then, the capacity control unit 9 may be configured to determine the secondary capacity values (that is, post-switching capacity values) of the queues Q0 and Q1 used in the secondary switching process based on the capacity value information included in the received frame determined to be the burst factor frame in S110 of FIG. 4.

3-3. Other Embodiment 3

The number of queues for each port is not limited to 2, and may be 1 or 3 or more.

The number of queues for which the secondary capacity value is larger than the primary capacity value is not limited to one, but may be two or more.

The switching condition may be a condition in which the occurrence of a frame loss due to burst traffic is detected.

The capacity control unit 9 is configured to switch the capacity distribution pattern to the primary pattern when a predetermined time T1 elapses after the capacity distribution pattern is switched to the secondary pattern, but the present disclosure is not limited to the above configuration. For example, the capacity distribution pattern may be switched from the secondary pattern to the primary pattern when a specific frame is received. In addition, the capacity distribution pattern may be switched from the secondary pattern to the primary pattern when a predetermined time has elapsed since the reception of the specific frame.

When multiple different secondary patterns are provided, the predetermined time for switching the capacity distribution pattern from the secondary pattern to the primary pattern may be set to different times. Furthermore, when having multiple different secondary patterns, the capacity distribution pattern can be not only switched from the primary pattern to the secondary pattern or from the secondary pattern to the primary pattern, but also switched from one secondary pattern to another.

The relay device 1 and its technique described in the present disclosure may be implemented by a dedicated computer provided by configuring a processor and a memory programmed to execute one or more functions embodied by a computer program. Alternatively, the relay device 1 and its technique described in the present disclosure may be implemented by a dedicated computer provided by configuring a processor by one or more dedicated hardware logic circuits. Alternatively, the relay device 1 and its technique described in the present disclosure may be implemented by one or more dedicated computers configured by a combination of a processor programmed to perform one or more functions and a memory and a processor configured by one or more hardware logic circuits. The computer program may also be stored on a computer readable non-transitory tangible recording medium as computer executable instructions. The technique for realizing the functions of the respective units included in the relay device 1 does not necessarily need to include software, and all of the functions may be realized with the use of one or multiple hardware.

In addition, multiple functions of one component in the above embodiment may be realized by multiple components, or a function of one component may be realized by multiple components. In addition, multiple functions of multiple components may be realized by one component, or a single function realized by multiple components may be realized by one component. In addition, a part of the configuration of the above embodiment may be omitted. At least a part of the configuration of the above embodiment may be added to or substituted for the configuration of the other above embodiment.

In addition to the relay device 1 described above, the present disclosure may be realized in various forms such as a system having the relay device 1 as a component, a program for causing a computer to function as the relay device 1, a non-transitory tangible recording medium such as a semiconductor memory in which the program is recorded, and a method for controlling the capacity of a frame storage queue in the relay device 1.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device for transferring a received frame, comprising:
   a plurality of ports for transmitting and receiving a frame;
   at least one queue arranged for each of the ports, storing a transmission scheduled frame which is to be transmitted from a corresponding port, and having a variable storage capacity; and
   a capacity controller controlling the storage capacity of each of queues for the ports, wherein:
   a distribution pattern of a value of the storage capacity allocated to each of the queues is defined as a capacity distribution pattern;
   the capacity distribution pattern includes a first pattern which is the capacity distribution pattern in an initial state and a second pattern which is different from the first pattern; and
   the capacity controller switches the capacity distribution pattern from the first pattern to the second pattern when a predetermined switching condition is satisfied, wherein:
   when switching the capacity distribution pattern, one of the queues whose usage storage capacity exceeds a post-switching storage capacity, which is the storage capacity in the capacity distribution pattern after switching, is defined as an excess queue;
   the capacity controller performs a capacity change process at predetermined time intervals until the usage storage capacity of the excess queue becomes equal to or less than the post-switching storage capacity by transmitting a frame stored in the excess queue;
   the capacity change process includes: setting the storage capacity of the excess queue to a current usage storage capacity of the excess queue; and allocating a decrease in the storage capacity of the excess queue, which is generated by the setting of the storage capacity, to a storage capacity of at least another one of the queues whose post-switching storage capacity is larger than a pre-switching storage capacity; and
   the pre-switching storage capacity is the storage capacity in the capacity distribution pattern before switching.

2. The relay device according to claim 1, wherein:
   in the first pattern and the second pattern, at least one of the queues has a larger value of the storage capacity in the second pattern than in the first pattern.

3. The relay device according to claim 1, wherein:
   the capacity controller switches the capacity distribution pattern from the second pattern to the first pattern when a predetermined time elapses after switching the capacity distribution pattern from the first pattern to the second pattern.

4. The relay device according to claim 1, wherein:
   when switching the capacity distribution pattern, the capacity controller discards a frame exceeding the post-switching storage capacity, which is the storage capacity in the capacity distribution pattern after switching, among frames stored in one of the queues whose usage storage capacity exceeds the post-switching storage capacity.

5. The relay device according to claim 1, wherein:
   the capacity controller determines whether the switching condition is satisfied based on specific information included in the received frame.

6. The relay device according to claim 1, wherein:
   the switching condition includes a plurality of switching requirements;
   each of the switching requirements has a different second pattern; and
   the capacity controller switches the capacity distribution pattern from the first pattern to one of second patterns corresponding to one of the switching requirements that is determined to be established when the one of the switching requirements is established.

7. The relay device according to claim 1, wherein:
   the capacity controller changes the storage capacity of each of the queues in the second pattern based on information included in the received frame when the switching condition is satisfied.

8. A relay device for transferring a received frame, comprising:
   a plurality of ports for transmitting and receiving a frame;
   at least one queue arranged for each of the ports, storing a transmission scheduled frame which is to be transmitted from a corresponding port, and having a variable storage capacity; and
   a capacity controller controlling the storage capacity of each of queues for the ports, wherein:
   a distribution pattern of a value of the storage capacity allocated to each of the queues is defined as a capacity distribution pattern;
   the capacity distribution pattern includes a first pattern which is the capacity distribution pattern in an initial state and a second pattern which is different from the first pattern;
   the capacity controller switches the capacity distribution pattern from the first pattern to the second pattern when a predetermined switching condition is satisfied; and
   the capacity controller switches the capacity distribution pattern from the second pattern to the first pattern when a predetermined time elapses or a specific frame is received after switching the capacity distribution pattern from the first pattern to the second pattern.

9. The relay device according to claim 8, wherein:
   in the first pattern and the second pattern, at least one of the queues has a larger value of the storage capacity in the second pattern than in the first pattern.

10. The relay device according to claim 8, wherein:
    when switching the capacity distribution pattern, the capacity controller discards a frame exceeding a post-switching storage capacity, which is the storage capacity in the capacity distribution pattern after switching, among frames stored in one of the queues whose usage storage capacity exceeds the post-switching storage capacity.

11. The relay device according to claim 8, wherein:
when switching the capacity distribution pattern, one of the queues whose usage storage capacity exceeds a post-switching storage capacity, which is the storage capacity in the capacity distribution pattern after switching, is defined as an excess queue;
the capacity controller performs a capacity change process at predetermined time intervals until the usage storage capacity of the excess queue becomes equal to or less than the post-switching storage capacity by transmitting a frame stored in the excess queue;
the capacity change process includes: setting the storage capacity of the excess queue to a current usage storage capacity of the excess queue; and allocating a decrease in the storage capacity of the excess queue, which is generated by the setting of the storage capacity, to a storage capacity of at least another one of the queues whose post-switching storage capacity is larger than a pre-switching storage capacity; and the pre-switching storage capacity is the storage capacity in the capacity distribution pattern before switching.

12. The relay device according to claim 8, wherein:
the capacity controller determines whether the switching condition is satisfied based on specific information included in the received frame.

13. The relay device according to claim 8, wherein:
the switching condition includes a plurality of switching requirements;
each of the switching requirements has a different second pattern; and
the capacity controller switches the capacity distribution pattern from the first pattern to one of second patterns corresponding to one of the switching requirements that is determined to be established when the one of the switching requirements is established.

14. The relay device according to claim 8, wherein:
the capacity controller changes the storage capacity of each of the queues in the second pattern based on information included in the received frame when the switching condition is satisfied.

* * * * *